United States Patent
Thota et al.

(10) Patent No.: US 12,360,797 B2
(45) Date of Patent: *Jul. 15, 2025

(54) TRAVERSING AN ADJACENCY LIST ON DISTRIBUTED PROCESSORS

(71) Applicant: Walmart Apollo, LLC, Bentonville, AR (US)

(72) Inventors: Saigopal Thota, Fremont, CA (US); Mridul Jain, Cupertino, CA (US); Albin Kuruvilla, Bangaluru (IN); Pruthvi Raj Eranti, Secunderabad (IN); Antriksh Shah, Bangaluru (IN)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 18/096,273

(22) Filed: Jan. 12, 2023

(65) Prior Publication Data

US 2023/0145505 A1     May 11, 2023

Related U.S. Application Data

(63) Continuation of application No. 16/777,834, filed on Jan. 30, 2020, now Pat. No. 11,556,370.

(51) Int. Cl.
| | | |
|---|---|---|
| G06F 9/455 | (2018.01) | |
| G06F 9/38 | (2018.01) | |
| G06F 16/907 | (2019.01) | |

(52) U.S. Cl.
CPC ........ *G06F 9/45558* (2013.01); *G06F 9/3891* (2013.01); *G06F 16/907* (2019.01);
(Continued)

(58) Field of Classification Search
None
See application file for complete search history.

(56) References Cited

U.S. PATENT DOCUMENTS 9,172,621 B1 * 10/2015 Dippenaar .......... H04L 41/0879
10,191,998 B1    1/2019 Burkhardt
(Continued)

OTHER PUBLICATIONS

Wikipedia, "MapReduce," https://en.wikipedia.org/wiki/MapReduce, pp. 1-13, accessed on Jan. 19, 2020. 2020.
(Continued)

*Primary Examiner* — Wynuel S Aquino
(74) *Attorney, Agent, or Firm* — DICKINSON WRIGHT RLLP; Hector A. Agdeppa

(57) ABSTRACT

A distributed system including multiple processors associated with non-transitory computer-readable media storing computing instructions. The computing instructions, when collectively executed on the multiple processors, cause the multiple processors collectively to perform certain acts. The acts can include executing multiple iterations until a stopping condition is satisfied, by, for each of the multiple iterations: (i) processing a set of input nodes at the multiple processors using a set of criteria to generate first data at the multiple processors, wherein the set of input nodes is different at each of the multiple iterations; (ii) determining a list of output nodes using adjacency rows of an adjacency list at different ones of the multiple processors, such that each output node of the list of output nodes is one hop from a respective input node of the set of the input nodes; and (iii) updating the set of the input nodes for a subsequent iteration of the multiple iterations based on the list of output nodes when the stopping condition is not satisfied. The acts also can include outputting second data based at least in part on the first data. Other embodiments are disclosed.

20 Claims, 6 Drawing Sheets

400

(52) U.S. Cl.
CPC ............... *G06F 2009/4557* (2013.01); *G06F 2009/45575* (2013.01)

(56) References Cited

U.S. PATENT DOCUMENTS

| | | | |
|---|---|---|---|
| 10,606,892 B1* | 3/2020 | Broecheler | G06F 16/278 |
| 2007/0011659 A1* | 1/2007 | Venolia | G06F 16/904 |
| | | | 707/E17.011 |
| 2012/0192138 A1 | 7/2012 | Delling et al. | |
| 2013/0304755 A1 | 11/2013 | Zhou et al. | |
| 2015/0006316 A1 | 1/2015 | Zhou | |
| 2015/0293994 A1 | 10/2015 | Kelly | |
| 2015/0302063 A1 | 10/2015 | Nigam et al. | |
| 2016/0335322 A1 | 11/2016 | Then et al. | |
| 2017/0039245 A1 | 2/2017 | Wholey, III | |
| 2017/0091246 A1 | 3/2017 | Risvik et al. | |
| 2017/0242958 A1 | 8/2017 | Brown | |
| 2017/0308809 A1 | 10/2017 | Mozes | |
| 2018/0329958 A1 | 11/2018 | Choudhury et al. | |
| 2019/0050561 A1* | 2/2019 | Li | G06F 21/552 |
| 2019/0057142 A1 | 2/2019 | Wang et al. | |
| 2019/0391981 A1* | 12/2019 | Hosoya | G06F 16/2477 |
| 2020/0257731 A1 | 8/2020 | Srinivas | |
| 2020/0285508 A1* | 9/2020 | Lu | G06F 9/5005 |
| 2021/0097079 A1* | 4/2021 | Pan | G06F 16/9024 |
| 2021/0109905 A1* | 4/2021 | Li | G06F 16/182 |

OTHER PUBLICATIONS

Hadoop, "Apache Hadoop 3.2.1—MapReduce Tutorial," https://hadoop.apache.org/docs/current/hadoop-mapreduce-client/hadoop-mapreduce-client-core/MapReduceTutorial.html, pp. 1-22, accessed on Jan. 19, 2020. 2020.

* cited by examiner

TRAVERSING AN ADJACENCY LIST ON DISTRIBUTED PROCESSORS

CROSS-REFERENCE TO RELATED APPLICATIONS

This application is a continuation of U.S. application Ser. No. 16/777,834, filed Jan. 30, 2020. U.S. application Ser. No. 16/777,834 is incorporated herein by reference in its entirety.

TECHNICAL FIELD

This disclosure relates generally to traversing an adjacency list on distributed processors.

BACKGROUND

A graph of nodes and edges can include multiple components, which can be subgraphs of the graph. Some of these connected components can be small connected components, with relatively few nodes and edges, and there can be one or more large connected components, which can have many nodes and edges. When a connected component becomes very large, such as having over a billion nodes, conventional techniques for traversing the connected component are not feasible using a single processing node with conventional memory limitations.

BRIEF DESCRIPTION OF THE DRAWINGS

To facilitate further description of the embodiments, the following drawings are provided in which.

Figure 1:
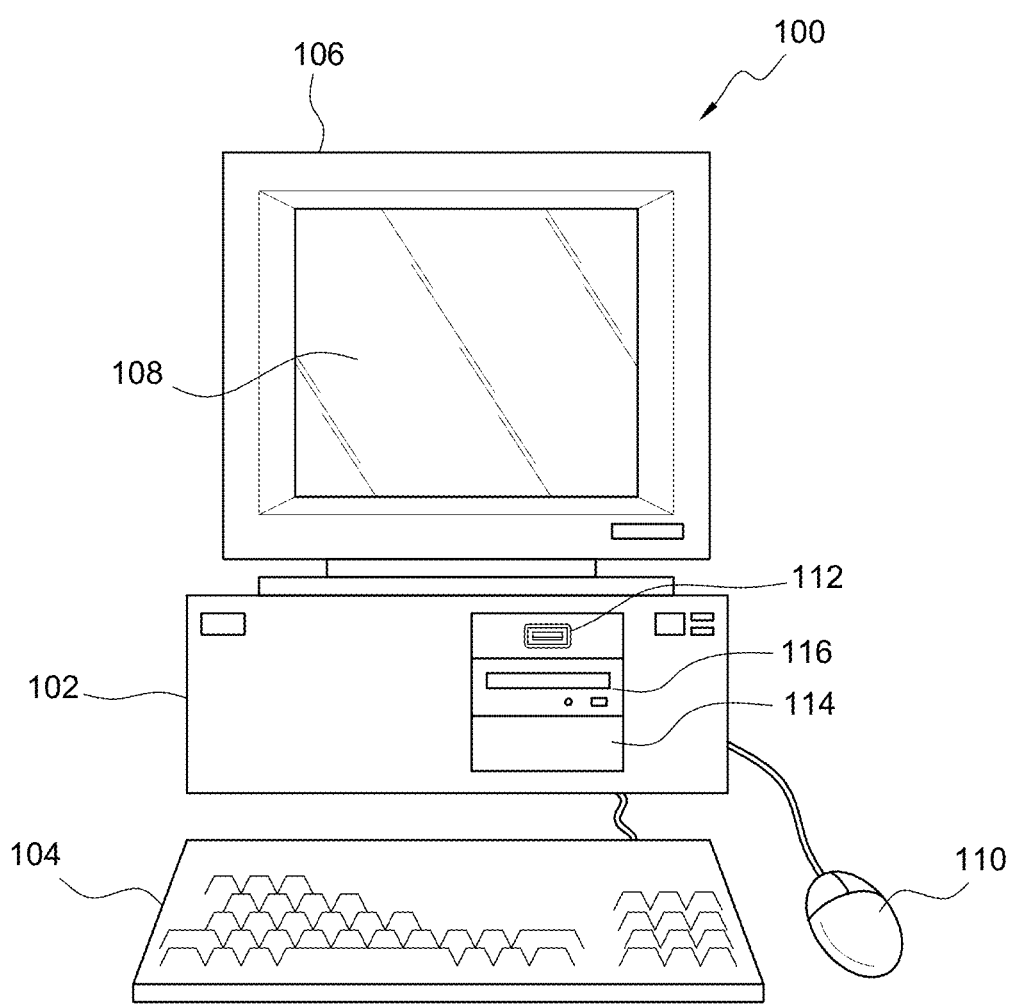
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.5 second, one second, or two seconds.

DESCRIPTION OF EXAMPLES OF EMBODIMENTS

Figure 2:
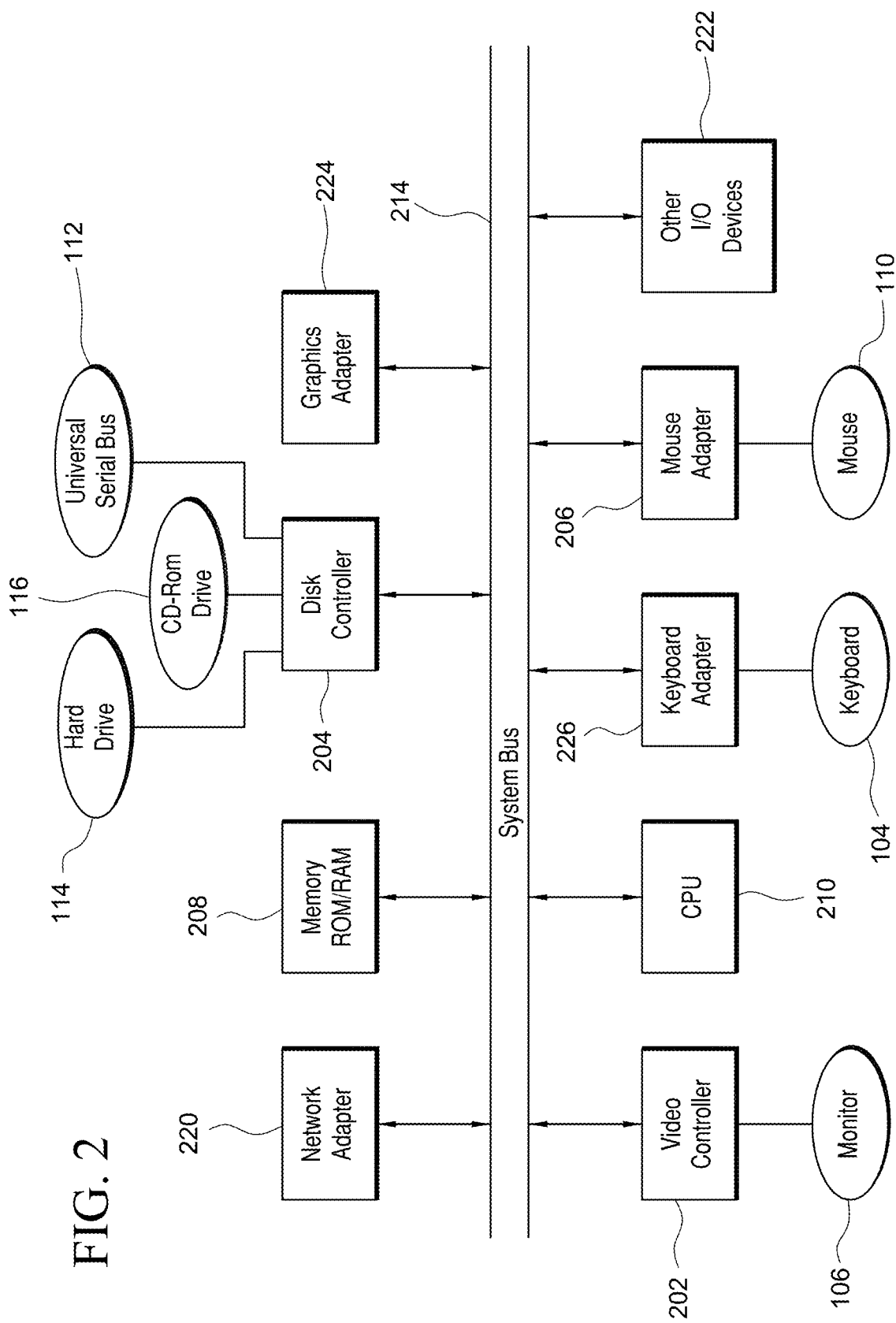
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
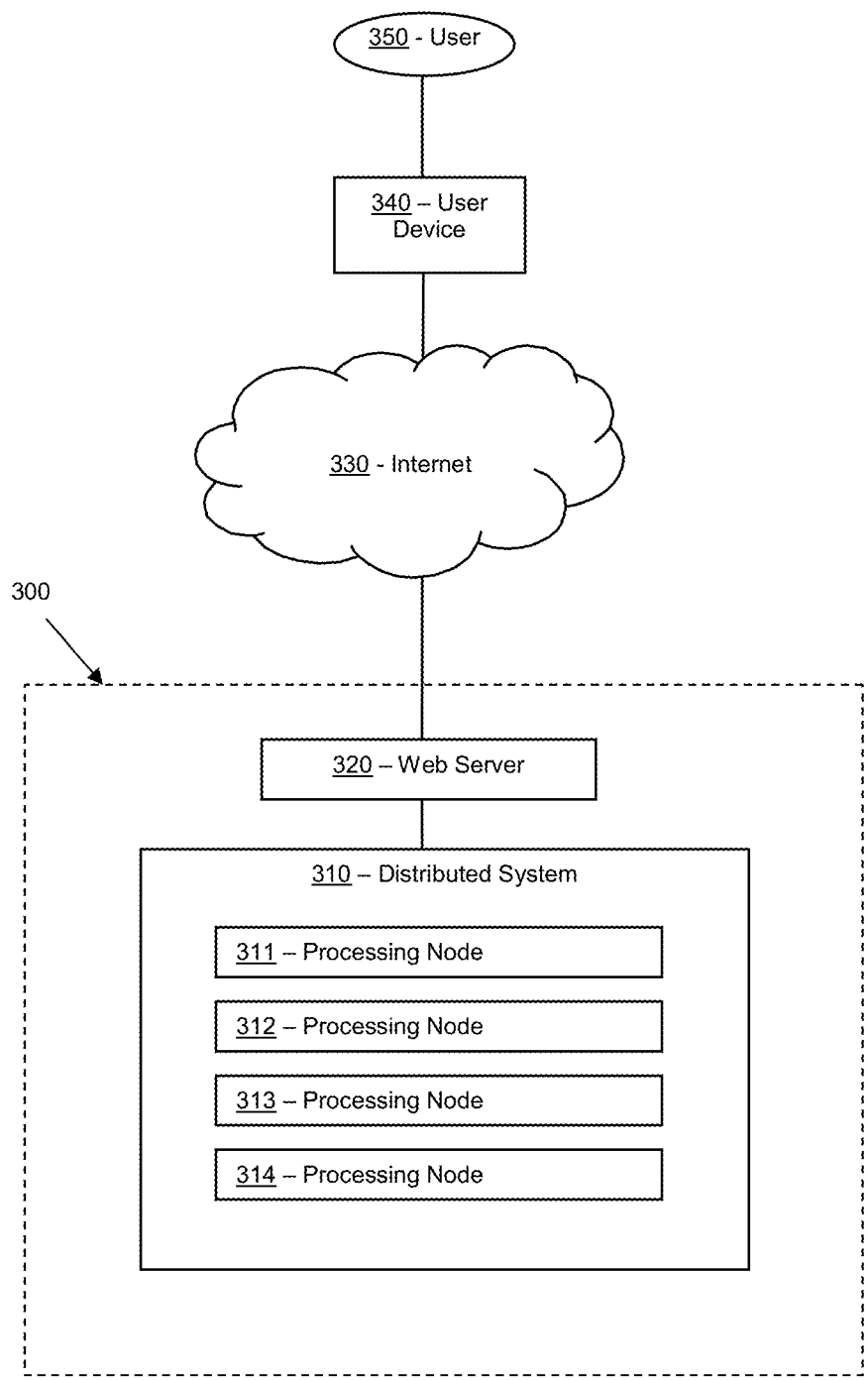
FIG. 3 illustrates a block diagram of a system that can be employed for traversing a large connected component on a distributed file-based data structure, according to an embodiment.

Turning ahead in the drawings, FIG. 3 illustrates a block diagram of a system 300 that can be employed for traversing a large connected component on a distributed file-based data structure, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a distributed system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, distributed system 310 can include multiple processing nodes, such as processing nodes 311-314. In many embodiments, processing nodes 311-314 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host processing nodes 311-314 and/or web server 320. Additional details regarding distributed system 310 and/or web server 320 are described herein. In some embodiments, processing nodes 311-314 each can be a virtual machine.

In some embodiments, web server 320 can be in data communication through Internet 330 with one or more user devices, such as a user device 340. User device 340 can be part of system 300 or external to system 300. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users to browse and/or search for items (e.g., products), to add items to an electronic cart, and/or to purchase items, in addition to other suitable activities.

In some embodiments, an internal network that is not open to the public can be used for communications between distributed system 310 and web server 320 within system 300, and or communications among processing nodes 311-314. Accordingly, in some embodiments, distributed system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, distributed system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to distributed system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of distributed system 310 and/or web server 320. In a similar manner, the processors and/or the non-transitory computer-readable media can be local and/or remote to each other.

Meanwhile, in many embodiments, distributed system 310 and/or web server 320 also can be configured to communicate with one or more databases (not shown). The one or more databases can include a product database that contains information about products, items, or SKUs (stock keeping units), among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, distributed system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, distributed system 310 can traverse a large connected component on a distributed file-based data structure. In many embodiments, information can be stored and related to each other using a graph. For example, user data can be collected, which can include data that is obtained from various channels including internal sources and external sources for a user (e.g., 350), such as a customer. As a result, a retailer may be able to more effectively track user activity, such as in-store purchases, online purchases, user advertisement activities, or any other suitable customer related activities to a user.

In many embodiments, the graph can be based on linkage data identifying a plurality of linkages, where each linkage identifies a link between a plurality of nodes. Each node can represent, for example, different user data. In some examples, the linking data can be based on transaction data, such as instore or online transaction data. For example, each node can represent an identifying feature of a user or transaction. For example, a node may identify an online identification (ID) such as a cookie, a user account identifier (e.g., when a user logged in) a credit card number, a purchase timestamp, a user name, a purchase timestamp, or a network address, for example. In some examples, a node can be known as a "traceable entity identifier," or simply "trentyid" or "tid." For example, credit cards, login account identifiers, cookies, and other suitable types of information obtained in transactions are traceable to identify a user. Other forms of information obtained in a transaction, such as cash payment, are not traceable, but the identity of the user can be obtained in some cases based on other information that is traceable. Linkage data may "link" two or more nodes together, indicating that the two are associated. For example, linkage data may link a credit card number and an online identifier together, based on a transaction in which credit card number and the online identifier were used together.

In a number of embodiments, a graph of nodes and edges can be used to represent the linkages of the nodes. For example, an edge can represent a linkage between two nodes. In many embodiments, each edge can include edge metadata, which can be information about the linkage, such as a weight that indicates a strength of the linkage, a date or recency of the linkage, a confidence score that indicates a likelihood that the linkage is accurate, and/or other suitable information. The graph can be referred to as a customer identity graph, as it can include information that identifies the customers (e.g., users).

In many embodiments, the graph can include multiple components, which can be subgraphs of the graph. Some of these connected components can be small connected components, with relatively few nodes and edges. For example, many each connection component can be designed to represent a single user, so the number of nodes in a connected component can be small, such as between 5 and 20 nodes, for example. In some cases, there can be one or more large connected components, which can have many nodes and edges. For example, in some cases a large connected component can include over 1 billion nodes. Large connected components can be generated based on noise in the user data. For example, if three people lived together in the same apartment with the same address, in some cases, connected components with nodes identifying each of these three people can become connected due to the transaction that included the same address. As another example, if many users log in to web server 320 from the same customer computer, such as at a public library, nodes representing each of these users can become connected due to a common cookie on the computer at the public library being used in transactions for each of the users. Due to such occurrences, the size of the connected component can become very large.

In many embodiments, traversing the connected components can be performed in order to determine information from the graph. For example, given a specific piece of information for a user, the graph can be used to determine other information about the user. More specifically, for example, given a particular user, the graph can be used to determine which of the computer devices of the user is used most frequently, which can be determined based on the cookies that track the user, as stored in the graph. As yet another example, the graph can be used to determine all users having a particular age range with certain additional characteristics. A traversal of the graph can be used to determine this information. Conventional traversal techniques, such as breadth-first search and/or depth-first search, can be used to traverse each of the small connected components. When a connected component becomes very large, such as having over a billion nodes, conventional techniques for traversing the connected component are not feasible using a single processing node with conventional memory limitations.

Figure 4:
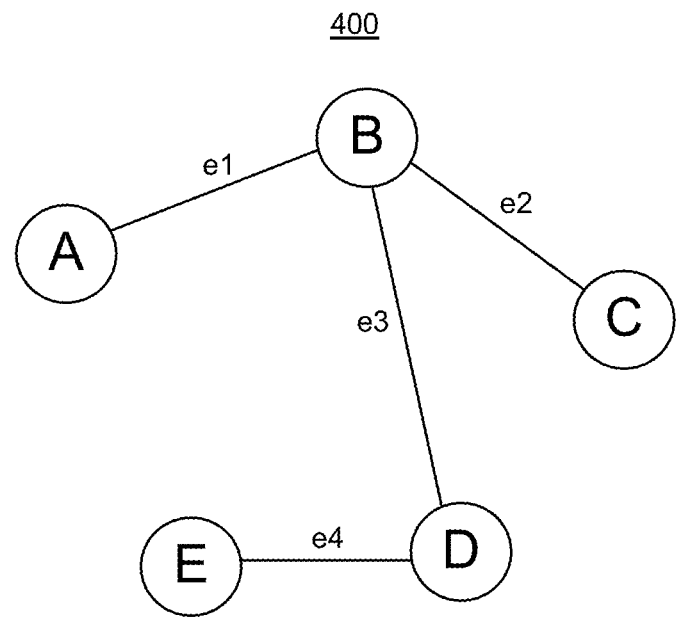
FIG. 4 illustrates an exemplary connected component.

Turning ahead in the drawings, FIG. 4 illustrates an exemplary connected component 400. For simplicity, connected component 400 is small, with five nodes, namely nodes A, B, C, D, and E. Each of nodes A-E can be a tid, which is associated with a user, such as a user account identifier, a user email address, a user phone number, a website cookie, a beacon tracking cookie, a visitor tracking cookie, a credit card representation, a model application identifier, and/or another suitable information that is traceable to a user. Node A is connected to node B by an edge e1, which indicates that the tids in nodes A and B were used together in a transaction, such as a first transaction. Node B is connected to node C by an edge e2, which indicates that the tids in nodes B and C were used together in a transaction, such as a second transaction. Node B also is connected to node D by an edge e3, which indicates that the tids in nodes B and D were used together in a transaction, such as a third transaction. Node D is connected to node E by an edge e4, which indicates that the tids in nodes D and E were used together in a transaction, such as a fourth transaction.

In many embodiments, a connected component (e.g., 400) can be represented and stored in a file-based data structure known as an adjacency list. An adjacency list can represent the connected component by including a list of the nodes, with one node per row, along with a mapping from the node on each row to the other nodes that are one hop away from that node. In an adjacency list, each node can be mapped to its neighbors that are one-hop away (e.g., connected by a single edge). For example, connected component 400 can be represented as the following adjacency list:

A: B
B: A, C, B
C: B
D: B, E
E: D

Connected component 400 is small, with five nodes, so the adjacency list for connected component 400 is small, with five rows. By contrast, a large connected component can include with over a billion nodes, such that the adjacency list for a large connected component can include over a billion rows. The adjacency list for a large connected component can be distributed across multiple process nodes (e.g., processing nodes 311-314). For example, the adjacency list can be horizontally distributed across 20 machines, such that each machine includes a portion of the adjacency list. In the example of the adjacency list for connected component 400, so an example of distributing it across multiple machines would be that each row could be stored on a separate machine, such that five machines are used to store the adjacency list.

Figure 5:
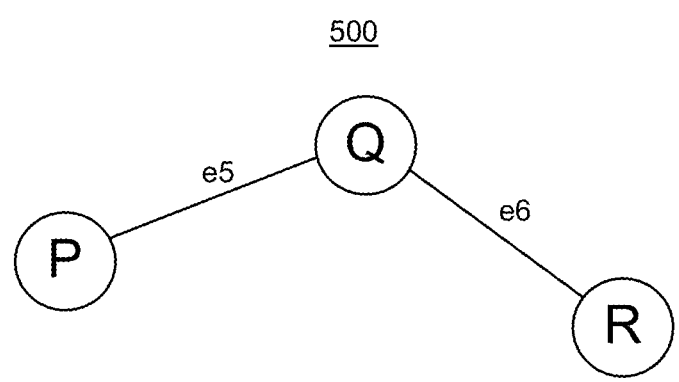
FIG. 5 illustrates another exemplary connected component.

Proceeding to the next drawing, FIG. 5 illustrates an exemplary connected component 500. For simplicity, connected component 500 is small, with three nodes, namely nodes P, Q, and R. Each of nodes P-R can be a tid, as described above. Node P is connected to node Q by an edge e5, which indicates that the tids in nodes P and Q were used together in a transaction, such as a fifth transaction. Node Q is connected to node R by an edge e6, which indicates that the tids in nodes Q and R were used together in a transaction, such as a sixth transaction.

In many embodiments, connected component 500 can be represented and stored in an adjacency list. For example, connected component 500 can be represented as the following adjacency list:

P: Q
Q: P, R
R: Q

In some examples, connected component 400 (FIG. 4) and connected component 500 (FIG. 5) can each be part of a customer identity graph. The customer identity graph can be traversed to determine user information about one or more of the users represented in the customer identity graph. For example, there can be a request to determine all nodes that satisfy specified input criteria, given input nodes A and P. In many embodiments, the connected components (e.g., 400, 500) can be traversed in iterations, moving one hop per iteration. For example, at iteration 1, input nodes A and P can be processed at the respective processing nodes storing nodes A and P, respectively. The machine that includes the portion of the adjacency list for connected component 400 that includes a row for node A can be accessed to determine information about node A, including the nodes that are one hop away from node A. Similarly, the machine that includes the portion of the adjacency list for connected component 500 that includes a row for node P can be accessed to determine information about node P, including the nodes that are one hop away from node P. In several embodiments, processing of a node can include applying the input criteria to the node and/or the edges associated with each node. In many embodiments, the nodes that are one hop away can be determined to be output nodes. For example, nodes B and Q can be determined as being the nodes that are one hop away from nodes A and P. In a number of embodiments, the information about whether the nodes and/or edges satisfied the input criteria and/or the output nodes can be consolidated at a single processing node. In some embodiments, the nodes that have been visited can be tracked as well, so that the traversal does not visit a node multiple times. The output nodes can be used as input nodes for the next iteration.

Using the simplified example described above, traversal of connected component 400 (FIG. 4) and connected component 500 (FIG. 5) can proceed through multiple iterations as shown below in Table 1:

TABLE 1

| Iteration | Input | Output | Visited Already |
|---|---|---|---|
| 1 | A, P | A(B), P(Q) | A, P |
| 2 | B, Q | B(C, D), Q (R) | A, P, B, Q |
| 3 | C, D, R | C( ), D(E), R( ) | A, P, B, Q, C, D, R |
| 4 | E | E( ) | A, P, B, Q, C, D, R, E |

In the example shown in Table 1, the entirety of connected component 400 (FIG. 4) and connected component 500 (FIG. 5) are traversed. In many embodiments, traversal can stop when a stopping condition is satisfied, such as there are no output nodes for the subsequent iteration, and/or another stopping condition, such as a predetermined number of iterations.

Figure 6:
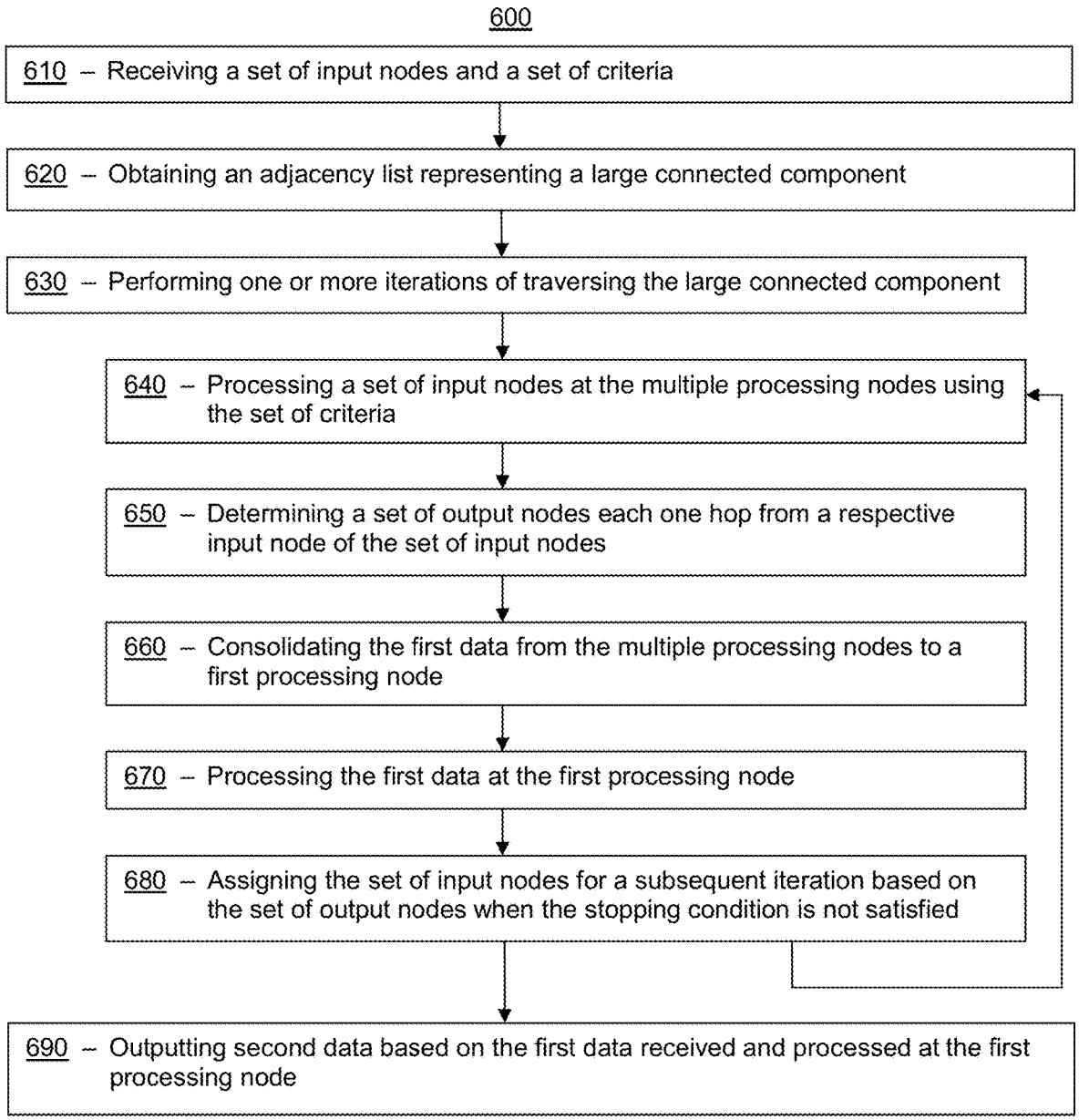
FIG. 6 illustrates a flow chart for a method, according to an embodiment.

Turning ahead in the drawings, FIG. 6 illustrates a flow chart for a method 600, according to an embodiment. In some embodiments, method 600 can be a method of traversing a large connected component on a distributed file-based data structure. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, system 300 (FIG. 3), distributed system 310 (FIG. 3), and/or web server 320 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can include a block 610 of receiving a set of input nodes and a set of criteria. In many embodiments, the input nodes can be one or more nodes to begin searching one or more large connected components, such as nodes A and P in the example described above in connection with connected component 400 (FIG. 4) and connected component 500 (FIG. 5). In a number of embodiments, the set of criteria include a depth limit, which can indicate how deep to traverse the connected component, when starting at the input nodes.

In a number of embodiments, the set of criteria can include at least one of a set of node criteria and/or a set of edge criteria. In several embodiments, the set of node criteria can include one or more conditions used to qualify a node. If node criteria is specified, nodes that meet the criteria can allow further traversal through (e.g., beyond) those nodes. Nodes that do not meet the node criteria can result in stopping at those nodes to not traverse beyond those nodes. In a number of embodiments, the node criteria can each include a key, an operator, and a value, which can be used to check whether the key of each node meets the operation specified with respect to the value specified.

In a number of embodiments, the set of edge criteria can include one or more conditions used to qualify an edge. In some embodiments, the criteria can be specified as an array of arrays. Inner arrays can be consider by an AND operator, and outer arrays can be considered by an OR operator. If edge criteria are specified, traversal can proceed along edges that meet the criteria, and not proceed along edges that do not meet the criteria. For example, the following edge criteria can be specified:

```
"edge_criteria":[
    [{"key":"type", "operator":"in", "value": "30"},
     {"key":"tenant_org_id", "operator":"in", "value": "4571"}],
    [{"key":"type", "operator":"in", "value": "53"},
     {"key":"source_system_code", "operator":"in", "value": "2"}]
]
``` which can specify two conditions in the outer OR operation, and each of these conditions include two conditions in the inner AND operation. For example, for an edge of type "30," it can be considered as qualified if the associated tenant_org_id=4571. For an edge of type "53," if can be considered as qualified if the associated source_system_code=2. In a number of embodiments, edge metadata can be included in the conditions of the edge criteria, such as a minimum confidence score. In many embodiments, an edge can be considered qualified if both edge criteria and node criteria are satisfied.

In several embodiments, the set of criteria can include a directionality criterion, such as unidirectional traversal or bidirectional traversal. Unidirectional traversal can mean that traversal can proceed to nodes of different types, but not to a node that is of the same type as one that has already been visited. For example, unidirectional traversal can proceed from a beacon tracking cookie to a credit card identifier, then to an account identifier, but cannot then proceed to another credit card identifier. Bidirectional traversal can proceed in the traversal without a unidirectional restriction.

In a number of embodiments, method 600 also can include a block 620 of obtaining an adjacency list representing a large connected component. The large connected component can be similar to connected components 400

(FIG. 4) and/or 500 (FIG. 5), described above, but can be larger. In several embodiments, the large connected component can include nodes, edges, and edge metadata. The nodes, edges, and/or edge metadata can be similar or identical to the nodes, edges, and/or metadata, respectively, described above. In some embodiments, a quantity of the nodes of the large connected component can exceed 1 billion. In other embodiments, the quantity can exceed 100 million. In yet other embodiments, the quantity can exceed 10 billion. In various embodiments, the adjacency list can be distributed across multiple processing nodes multiple processing nodes of a distributed system. In many embodiments, the nodes of the large connected component can include the input nodes. The distributed system can be similar or identical to distributed system 310 (FIG. 3). The multiple processing nodes can be similar or identical to processing nodes 311-314 (FIG. 3). In a number of embodiments, each of the multiple processing nodes of the distributed system can be a respective virtual machine.

In a number of embodiments, the edge metadata can be in the form of (key, value) pairs, and can include one or more pairs for each edge. In some embodiments, the edge metadata can include a respective confidence score associated with each of the edges. In a number of embodiments, the edge metadata can include a weight associated with each of the edges.

In several embodiments, method 600 additionally can include with a block 630 of performing one or more iterations of traversing the large connected component until a stopping condition is satisfied. In many embodiments, the stopping condition can be satisfied when a quantity of the one or more iterations equals the depth limit. In several embodiments, the stopping condition can be satisfied when the set of input nodes is empty for an iteration of the one or more iterations.

In a number of embodiments, block 630 can include a block 640 of processing a set of input nodes at the multiple processing nodes using the set of criteria to generate first data at the multiple processing nodes. In a number of embodiments, processing the set of input nodes at the multiple processing nodes can include filtering the input nodes based on a set of node criteria of the set of criteria.

In several embodiments, block 630 also can include with a block 650 of determining a set of output nodes such that each output node of the set of output nodes is one hop from a respective input node of the set of input nodes. In many embodiments, determining the set of output nodes can be based on the nodes adjacent to (e.g., within one hop of) the input nodes, and/or can include applying a set of edge criteria of the set of criteria to determine the set of output nodes.

In many embodiments, the processing in block 640 of processing a set of input nodes at the multiple processing nodes using the set of criteria to generate first data at the multiple processing nodes and/or block 650 of determining a set of output nodes such that each output node of the set of output nodes is one hop from a respective input node of the set of input nodes can be performed in parallel at different processing nodes (e.g., 311-314 (FIG. 3)), based on the machines at which the portions of the adjacency list for the input nodes are located. In many embodiments, block 640 of processing a set of input nodes at the multiple processing nodes using the set of criteria to generate first data at the multiple processing nodes and/or block 650 of determining a set of output nodes such that each output node of the set of output nodes is one hop from a respective input node of the set of input nodes can be performed by using a map function of a map-reduce framework. For example, Map/Reduce in Apache Hadoop can be used to implement the filtering based on the criteria. The data generated from the filtering can be the first data, which can be spread across the multiple processing nodes at which the processing occurred.

In a number of embodiments, block 630 additionally can include a block 660 of consolidating the first data from the multiple processing nodes to a first processing node of the multiple processing nodes. In many embodiments, the first processing node can be used to collect the information performed across the multiple processing nodes, as a synchronization activity, before performing the next iteration.

In several embodiments, block 630 further can include with a block 670 of processing the first data at the first processing node. For example, additional processing can be performed on the first data received, once it is consolidated. For example, the first data can be the nodes that have been visited that meet the conditions of the set of criteria. In many embodiments, block 660 of consolidating the first data from the multiple processing nodes to a first processing node of the multiple processing nodes and/or block 670 of processing the first data at the first processing node can be performed using a reduce function of the map-reduce framework. For example, the reduce function can perform shuffling of the first data and consolidating the first data.

In a number of embodiments, block 630 additionally can include a block 680 of assigning the set of input nodes for a subsequent iteration of the iterations based on the set of output nodes when the stopping condition is not satisfied. For example, as shown in Table 1, at the end of iteration 1, outputs B and Q can become inputs for iteration 2. When the stopping condition is not satisfied, blocks 640-680 can repeat in the subsequent iteration. Otherwise, if the stopping condition is satisfied, method 600 can continue to a block 690, described below.

In several embodiments, method 600 further can include block 690 of outputting second data based on the first data received and processed at the first processing node during the one or more iterations. For example, the second data can be all the nodes that are traversed and satisfy the criteria.

Figure 7:
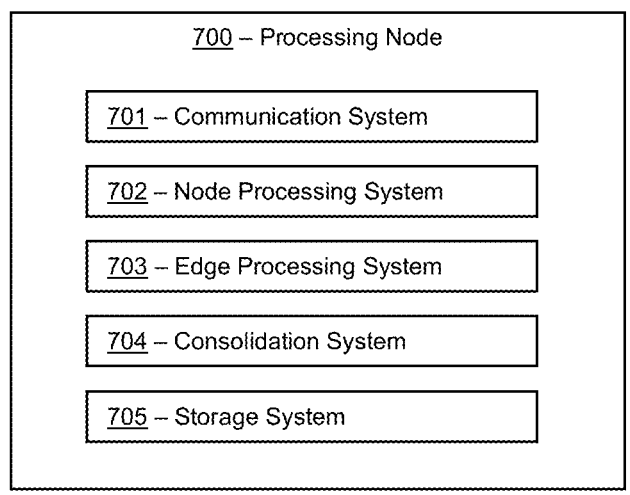
FIG. 7 illustrates a block diagram of a processing node that can be used to implement each of the processing nodes of FIG. 3.

Turning ahead in the drawings, FIG. 7 illustrates a block diagram of a processing node 700 that can be used to implement each of processing nodes 311-314 (FIG. 3). Processing node 700 is merely exemplary and embodiments of the processing node are not limited to the embodiments presented herein. The processing node can be employed in many different embodiments or examples not specifically depicted or described herein. In some embodiments, certain elements, modules, or systems of processing node 700 can perform various procedures, processes, and/or activities. In other embodiments, the procedures, processes, and/or activities can be performed by other suitable elements, modules, or systems of processing node 700.

Generally, therefore, processing node 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of processing node 700 described herein.

In many embodiments, the systems of processing node 700 can be modules of computing instructions (e.g., software modules) stored at non-transitory computer readable media that operate on one or more processors. In other embodiments, the systems of processing node 700 can be implemented in hardware.

Processing node 700 can be a computer system, such as computer system 100 (FIG. 1), as described above, and can be a single computer, a single server, or a cluster or collection of computers or servers, or a cloud of computers or servers. In another embodiment, a single computer system can host processing node 700.

In several embodiments, processing node 700 can include a communication system 701, a node processing system 702, an edge processing system 703, a consolidation system 704, and/or a storage system 705.

In several embodiments, communication system 701 can at least partially perform block 610 (FIG. 6) of receiving a set of input nodes and a set of criteria; block 620 (FIG. 6) of obtaining an adjacency list representing a large connected component; and/or block 690 (FIG. 6) of outputting second data based on the first data received and processed at the first processing node during the one or more iterations.

In several embodiments, node processing system 702 can at least partially perform block 630 (FIG. 6) of performing one or more iterations of traversing the large connected component until a stopping condition is satisfied; and/or block 640 (FIG. 6) of processing a set of input nodes at the multiple processing nodes using the set of criteria to generate first data at the multiple processing nodes.

In a number of embodiments, edge processing system 703 can at least partially perform block 630 (FIG. 6) of performing one or more iterations of traversing the large connected component until a stopping condition is satisfied; and/or block 650 (FIG. 6) of determining a set of output nodes such that each output node of the set of output nodes is one hop from a respective input node of the set of input nodes.

In several embodiments, consolidation system 704 can at least partially perform block 630 (FIG. 6) of performing one or more iterations of traversing the large connected component until a stopping condition is satisfied; block 660 (FIG. 6) of consolidating the first data from the multiple processing nodes to a first processing node of the multiple processing nodes; block 670 (FIG. 6) of processing the first data at the first processing node; and/or block 680 (FIG. 6) of assigning the set of input nodes for a subsequent iteration of the iterations based on the set of output nodes when the stopping condition is not satisfied.

In a number of embodiments, storage system 705 can at least partially perform block 620 (FIG. 6) of obtaining an adjacency list representing a large connected component; and/or block 690 (FIG. 6) of outputting second data based on the first data received and processed at the first processing node during the one or more iterations.

In many embodiments, the techniques described herein can provide a practical application and several technological improvements. In some embodiments, the techniques described herein can provide for traversing a large connected component on a distributed file-based data structure. These techniques described herein can make it feasible to traverse a large connected component that is too large to load into memory on a single machine, for example. By distributing the large connected component across multiple processing nodes, the large connected component can be traversed in a distributed manner.

In a number of embodiments, the techniques described herein can solve a technical problem that arises only within the realm of computer networks, as connected components are data structures that do not exist outside the realm of computer networks. Moreover, the techniques described herein can solve a technical problem that cannot be solved outside the context of computer networks. Specifically, the techniques described herein cannot be used outside the context of computer networks, as they involve using multiple processing nodes.

Various embodiments can include a distributed system including multiple processing nodes. The distributed system can perform certain acts. The acts can include receiving a set of input nodes and a set of criteria. The acts can include obtaining an adjacency list representing a large connected component. The large connected component can include nodes, edges, and edge metadata. A quantity of the nodes of the large connected component can exceed 1 billion. The adjacency list can be distributed across the multiple processing nodes. The nodes of the large connected component can include the input nodes. The acts also can include performing one or more iterations of traversing the large connected component until a stopping condition is satisfied. Each iteration can include processing a set of input nodes at the multiple processing nodes using the set of criteria to generate first data at the multiple processing nodes, determining a set of output nodes such that each output node of the set of output nodes is one hop from a respective input node of the set of input nodes, consolidating the first data from the multiple processing nodes to a first processing node of the multiple processing nodes, processing the first data at the first processing node; and assigning the set of input nodes for a subsequent iteration of the one or more iterations based on the set of output nodes when the stopping condition is not satisfied. The acts further can include outputting second data based on the first data received and processed at the first processing node during the one or more iterations.

A number of embodiments can include a method. The method can include receiving a set of input nodes and a set of criteria. The method can include obtaining an adjacency list representing a large connected component. The large connected component can include nodes, edges, and edge metadata. A quantity of the nodes of the large connected component can exceed 1 billion. The adjacency list can be distributed across multiple processing nodes. The nodes of the large connected component can include the input nodes. The method also can include performing one or more iterations of traversing the large connected component until a stopping condition is satisfied. Each iteration can include processing a set of input nodes at the multiple processing nodes using the set of criteria to generate first data at the multiple processing nodes, determining a set of output nodes such that each output node of the set of output nodes is one hop from a respective input node of the set of input nodes, consolidating the first data from the multiple processing nodes to a first processing node of the multiple processing nodes, processing the first data at the first processing node; and assigning the set of input nodes for a subsequent iteration of the one or more iterations based on the set of output nodes when the stopping condition is not satisfied. The method further can include outputting second data based on the first data received and processed at the first processing node during the one or more iterations.

Various embodiments can include a distributed system including multiple processors associated with non-transitory computer-readable media storing computing instructions. The computing instructions, when collectively executed on the multiple processors, cause the multiple processors collectively to perform certain acts. The acts can include executing multiple iterations until a stopping condition is satisfied, by, for each of the multiple iterations: (i) processing a set of input nodes at the multiple processors using a set of criteria to generate first data at the multiple processors, wherein the set of input nodes is different at each of the multiple iterations; (ii) determining a list of output nodes using adjacency rows of an adjacency list at different ones of the multiple processors, such that each output node of the list of output nodes is one hop from a respective input node of the set of the input nodes; and (iii) updating the set of the input nodes for a subsequent iteration of the multiple iterations based on the list of output nodes when the stopping condition is not satisfied. The acts also can include outputting second data based at least in part on the first data.

A number of embodiments can include a method. The method can include executing multiple iterations until a stopping condition is satisfied, by, for each of the multiple iterations: (i) processing a set of input nodes at multiple processors using a set of criteria to generate first data at the multiple processors, wherein the set of input nodes is different at each of the multiple iterations; (ii) determining a list of output nodes using adjacency rows of an adjacency list at different ones of the multiple processors, such that each output node of the list of output nodes is one hop from a respective input node of the set of the input nodes; and (iii) updating the set of the input nodes for a subsequent iteration of the multiple iterations based on the list of output nodes when the stopping condition is not satisfied. The acts also can include outputting second data based at least in part on the first data.

Although the method described above is with reference to the illustrated flowchart, it will be appreciated that many other ways of performing the acts associated with the method can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although traversing a large connected component on a distributed file-based data structure has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders. As another example, the systems within processing node 700 in FIG. 7 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A distributed system comprising:
multiple processors associated with non-transitory computer-readable media storing computing instructions, wherein the computing instructions, when collectively executed on the multiple processors, cause the multiple processors collectively to perform:
  executing multiple iterations until a stopping condition is satisfied, by, for each of the multiple iterations:
    processing a set of input nodes at the multiple processors using a set of criteria to generate first data at the multiple processors, wherein the set of input nodes is different at each of the multiple iterations, and wherein processing the set of input nodes at the multiple processors further comprises filtering the input nodes based on a set of node criteria of the set of criteria;
    determining a list of output nodes using adjacency rows of an adjacency list at different ones of the multiple processors, such that each output node of the list of output nodes is one hop from a respective input node of the set of the input nodes, wherein the adjacency list is distributed across the distributed system such that each respective processor of the multiple processors can load a respective subset of the adjacency list into a respective memory associated with the respective processor, wherein the adjacency list is too large to be loaded into a respective memory associated with any one of the multiple processors, and wherein determining the list of output nodes further comprises applying a set of edge criteria of the set of criteria to determine the list of output nodes;
    consolidating the first data from the multiple processors to process the first data on a first processor of the multiple processors; and updating the set of the input nodes for a subsequent iteration of the multiple iterations based on the list of output nodes when the stopping condition is not satisfied; and outputting second data based at least in part on the first data consolidated at the first processor during the multiple iterations.

2. The distributed system of claim 1, wherein the adjacency list represents a large connected component comprising nodes, edges, and edge metadata.

3. The distributed system of claim 2, wherein the edge metadata comprises a respective confidence score associated with each of the edges.

4. The distributed system of claim 2, wherein the edge metadata comprises a weight associated with each of the edges.

5. The distributed system of claim 1, wherein:
the set of criteria comprises a depth limit;
the stopping condition is satisfied when a quantity of the multiple iterations equals the depth limit; and
the stopping condition is satisfied when the set of input nodes is empty for an iteration of the multiple iterations.

6. The distributed system of claim 1, wherein filtering the input nodes and applying the set of edge criteria to determine the list of output nodes are performed using a map function of a map-reduce framework.

7. The distributed system of claim 6, wherein consolidating the first data from the multiple processors to process the first data on the first processor of the multiple processors comprises using a reduce function of the map-reduce framework.

8. A method comprising:
executing multiple iterations until a stopping condition is satisfied, by, for each of the multiple iterations:
processing a set of input nodes at multiple processors of a distributed system using a set of criteria to generate first data at the multiple processors, wherein the set of input nodes is different at each of the multiple iterations, and wherein processing the set of input nodes at the multiple processors further comprises filtering the input nodes based on a set of node criteria of the set of criteria;
determining a list of output nodes using adjacency rows of an adjacency list at different ones of the multiple processors, such that each output node of the list of output nodes is one hop from a respective input node of the set of the input nodes, wherein the adjacency list is distributed across the distributed system such that each respective processor of the multiple processors can load a respective subset of the adjacency list into a respective memory associated with the respective processor, wherein the adjacency list is too large to be loaded into a respective memory associated with any one of the multiple processors, and wherein determining the list of output nodes further comprises applying a set of edge criteria of the set of criteria to determine the list of output nodes;
consolidating the first data from the multiple processors to process the first data on a first processor of the multiple processors; and
updating the set of the input nodes for a subsequent iteration of the multiple iterations based on the list of output nodes when the stopping condition is not satisfied; and outputting second data based at least in part on the first data consolidated at the first processor during the multiple iterations.

9. The method of claim 8, wherein the adjacency list represents a large connected component comprising nodes, edges, and edge metadata.

10. The method of claim 9, wherein the edge metadata comprises a respective confidence score associated with each of the edges.

11. The method of claim 9, wherein the edge metadata comprises a weight associated with each of the edges.

12. The method of claim 8, wherein:
the set of criteria comprises a depth limit;
the stopping condition is satisfied when a quantity of the multiple iterations equals the depth limit; and
the stopping condition is satisfied when the set of input nodes is empty for an iteration of the multiple iterations.

13. The method of claim 8, wherein filtering the input nodes and applying the set of edge criteria to determine the list of output nodes are performed using a map function of a map-reduce framework.

14. The method of claim 13, wherein consolidating the first data from the multiple processors to process the first data on the first processor of the multiple processors comprises using a reduce function of the map-reduce framework.

15. A non-transitory computer-readable medium comprising computing instructions that, when collectively executed on multiple processors, cause the multiple processors to collectively perform:
executing multiple iterations until a stopping condition is satisfied, by, for each of the multiple iterations:
processing a set of input nodes at multiple processors of a distributed system using a set of criteria to generate first data at the multiple processors, wherein the set of input nodes is different at each of the multiple iterations, and wherein processing the set of input nodes at the multiple processors further comprises filtering the input nodes based on a set of node criteria of the set of criteria;
determining a list of output nodes using adjacency rows of an adjacency list at different ones of the multiple processors, such that each output node of the list of output nodes is one hop from a respective input node of the set of the input nodes, wherein the adjacency list is distributed across the distributed system such that each respective processor of the multiple processors can load a respective subset of the adjacency list into a respective memory associated with the respective processor, wherein the adjacency list is too large to be loaded into a respective memory associated with any one of the multiple processors, and wherein determining the list of output nodes further comprises applying a set of edge criteria of the set of criteria to determine the list of output nodes;
consolidating the first data from the multiple processors to process the first data on a first processor of the multiple processors; and
updating the set of the input nodes for a subsequent iteration of the multiple iterations based on the list of output nodes when the stopping condition is not satisfied; and
outputting second data based at least in part on the first data consolidated at the first processor during the multiple iterations.

16. The non-transitory computer-readable medium of claim 15, wherein the adjacency list represents a large connected component comprising nodes, edges, and edge metadata.

17. The non-transitory computer-readable medium of claim 16, wherein the edge metadata comprises a respective confidence score associated with each of the edges.

18. The non-transitory computer-readable medium of claim 16, wherein the edge metadata comprises a weight associated with each of the edges.

19. The non-transitory computer-readable medium of claim 15, wherein:
  the set of criteria comprises a depth limit;
  the stopping condition is satisfied when a quantity of the multiple iterations equals the depth limit; and
  the stopping condition is satisfied when the set of input nodes is empty for an iteration of the multiple iterations.

20. The non-transitory computer-readable medium of claim 15, wherein:
  filtering the input nodes and applying the set of edge criteria to determine the list of output nodes are performed using a map function of a map-reduce framework; and
  consolidating the first data from the multiple processors to process the first data on the first processor of the multiple processors comprises using a reduce function of the map-reduce framework.

* * * * *